United States Patent
Cargnoni et al.

(10) Patent No.: US 9,058,178 B2
(45) Date of Patent: *Jun. 16, 2015

(54) SELECTIVE POSTED DATA ERROR DETECTION BASED ON REQUEST TYPE

(71) Applicant: INTERNATIONAL BUSINESS MACHINES CORPORATION, Armonk, NY (US)

(72) Inventors: Robert A. Cargnoni, Austin, TX (US); John S. Dodson, Austin, TX (US); Guy L. Guthrie, Austin, TX (US); William J. Starke, Round Rock, TX (US); Jeffrey A. Stuecheli, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 184 days.

This patent is subject to a terminal disclaimer.

(21) Appl. No.: 13/777,729

(22) Filed: Feb. 26, 2013

(65) Prior Publication Data

US 2014/0143613 A1 May 22, 2014

Related U.S. Application Data

(63) Continuation of application No. 13/679,549, filed on Nov. 16, 2012.

(51) Int. Cl.
*G06F 11/00* (2006.01)
*G06F 9/38* (2006.01)
*G06F 13/16* (2006.01)
*G06F 12/08* (2006.01)

(52) U.S. Cl.
CPC ........ *G06F 9/38* (2013.01); *G06F 11/00* (2013.01); *G06F 12/0897* (2013.01); *G06F 13/16* (2013.01)

(58) Field of Classification Search
CPC ........................................ G06F 11/006
USPC ...................... 714/48, 49, 54, 47.1
See application file for complete search history.

(56) References Cited

U.S. PATENT DOCUMENTS 5,490,149 A 2/1996 Nylander-Hill
5,500,950 A 3/1996 Becker et al.

(Continued)

OTHER PUBLICATIONS

Gonzalez et al., "Speculative Execution Via Address Prediction and Data Prefetching", Proceedings of the 11th international conference on Supercomputing, pp. 1-19, ACM New York, NY, USA © 1997.
Tendler, "POWER7 Processors: The Beat Goes On", pp. 1-50, Created Oct. 9, 2009.
U.S. Appl. No. 13/679,593 entitled "Selective Posted Data Error Detection Based on History"; Non-final office action dated Jul. 16, 2014.

(Continued)

*Primary Examiner* — Dieu-Minh Le
(74) *Attorney, Agent, or Firm* — Russell Ng PLLC; Matthew Baca

(57) ABSTRACT

In a data processing system, a selection is made, based at least on an access type of a memory access request, between at least a first timing and a second timing of data transmission with respect to completion of error detection processing on a target memory block of the memory access request. In response to receipt of the memory access request and selection of the first timing, data from the target memory block is transmitted to a requestor prior to completion of error detection processing on the target memory block. In response to receipt of the memory access request and selection of the second timing, data from the target memory block is transmitted to the requestor after and in response to completion of error detection processing on the target memory block.

10 Claims, 12 Drawing Sheets

(56) References Cited

U.S. PATENT DOCUMENTS

| | | |
|---|---|---|
| 5,912,906 A | 6/1999 | Wu et al. |
| 5,961,660 A * | 10/1999 | Capps et al. .................. 714/763 |
| 6,374,329 B1 | 4/2002 | McKinney et al. |
| 6,397,357 B1 * | 5/2002 | Cooper ......................... 714/703 |
| 6,553,480 B1 | 4/2003 | Cheong et al. |
| 6,654,925 B1 | 11/2003 | Meaney et al. |
| 7,516,371 B2 * | 4/2009 | Sakaue et al. .................. 714/52 |
| 7,590,826 B2 | 9/2009 | Begon et al. |
| 7,984,357 B2 | 7/2011 | Kirscht et al. |
| 8,103,910 B2 | 1/2012 | Blumrich et al. |
| 8,145,985 B2 | 3/2012 | Moyer |
| 8,190,860 B2 | 5/2012 | Moyer et al. |
| 2008/0005647 A1 | 1/2008 | Bains |
| 2009/0150748 A1 | 6/2009 | Egner et al. |
| 2010/0122148 A1 | 5/2010 | Flynn et al. |

OTHER PUBLICATIONS

U.S. Appl. No. 13/679,549 entitled "Selective Posted Data Error Detection Based on Request Type"; Non-final office action dated Jul. 21, 2014.

U.S. Appl. No. 13/679,593 entitled "Selective Posted Data Error Detection Based on History"; Notice of Allowance dated Nov. 18, 2014.

U.S. Appl. No. 13/679,549 entitled "Selective Posted Data Error Detection Based on Request Type"; Notice of Allowance dated Nov. 6, 2014.

U.S. Appl. No. 13/777,791 entitled "Selective Posted Data Error Detection Based on History"; Notice of Allowance dated Nov. 14, 2014.

U.S. Appl. No. 13/777,791 entitled "Selective Posted Data Error Detection Based on History"; Non-final office action dated Jul. 22, 2014.

* cited by examiner

US 9,058,178 B2

SELECTIVE POSTED DATA ERROR DETECTION BASED ON REQUEST TYPE

PRIORITY CLAIM

This application is a continuation of U.S. patent application Ser. No. 13/679,549 entitled "SELECTIVE POSTED DATA ERROR DETECTION BASED ON REQUEST TYPE," filed on Nov. 16, 2012, the disclosure of which is incorporated herein by reference in its entirety for all purposes.

BACKGROUND OF THE INVENTION

The present invention relates in general to data processing. In some aspects, the present invention relates to decreasing effective data access latency by varying the timing of error detection processing in a memory subsystem of a data processing system. In other aspects, the present invention relates to improving utilizing of processing resources by speculatively finishing instructions associated with high latency operations.

In processor chip design, the trend has been to include an ever increasing number of processor cores per processor chip. Increasing the number of processor cores increases the volume of data consumed by execution of the processor cores, and accordingly places pressure on the bit rates of chip-to-chip interconnects and external memory (e.g., dynamic random access memory (DRAM)) to supply the required volume of data. However, these higher bit rates result in higher inherent bit error rates on the interconnects, thus requiring more robust error-correcting code (ECC) and/or cyclic redundancy check (CRC) codes to ensure a reasonable level of data integrity. Further, complex error codes, such as ECC and CRC, tend to increase access latency due to the need for deeper error correction logic pipelines for error detection and correction.

Another trend impacting processor chip design is that DRAM access latency, while continuing to slowly improve over recent years, has not kept pace with increases in processor core clock rates. Thus, external memory access latency, as measured relative to processor clock rates, has actually degraded. The conventional technique for compensating for external memory access latency has been to implement larger and deeper on-chip cache hierarchies to buffer frequently used data closer to the consuming processor cores. However, limits in overall chip sizes forces a tradeoff between the number of processor cores and the amount of cache memory on the chip. Consequently, the opportunity to improve effective memory access latency simply by increasing on-chip cache capacity is limited.

BRIEF SUMMARY

In some embodiments, effective memory access latency is improved by masking access latency through selective application of posted error detection processing.

In some embodiments, utilization of processing resources is improved by speculatively finishing instructions associated with high latency operations.

In at least one embodiment, a selection is made, based at least on an access type of a memory access request, between at least a first timing and a second timing of data transmission with respect to completion of error detection processing on a target memory block of the memory access request. In response to receipt of the memory access request and selection of the first timing, data from the target memory block is transmitted to a requestor prior to completion of error detection processing on the target memory block. In response to receipt of the memory access request and selection of the second timing, data from the target memory block is transmitted to the requestor after and in response to completion of error detection processing on the target memory block.

In at least one embodiment, a selection is made, based at least on addresses of previously detected errors in a memory subsystem, between at least a first timing and a second timing of data transmission with respect to completion of error detection processing on a target memory block of the memory access request. In response to receipt of the memory access request and selection of the first timing, data from the target memory block is transmitted to a requestor prior to completion of error detection processing on the target memory block. In response to receipt of the memory access request and selection of the second timing, data from the target memory block is transmitted to the requestor after and in response to completion of error detection processing on the target memory block.

In at least one embodiment, high latency operations are tracked in entries of a data structure associated with an execution unit of the processor core. In the execution unit, execution of an instruction dependent on a high latency operation tracked by an entry of the data structure is speculatively finished prior to completion of the high latency operation. Speculatively finishing the instruction includes reporting an identifier of the entry to completion logic of the processor core and removing the instruction from an execution pipeline of the execution unit. The completion logic records dependence of the instruction on the high latency operation and commits execution results of the instruction to an architected state of the processor only after successful completion of the high latency operation.

DETAILED DESCRIPTION

Figure 1:
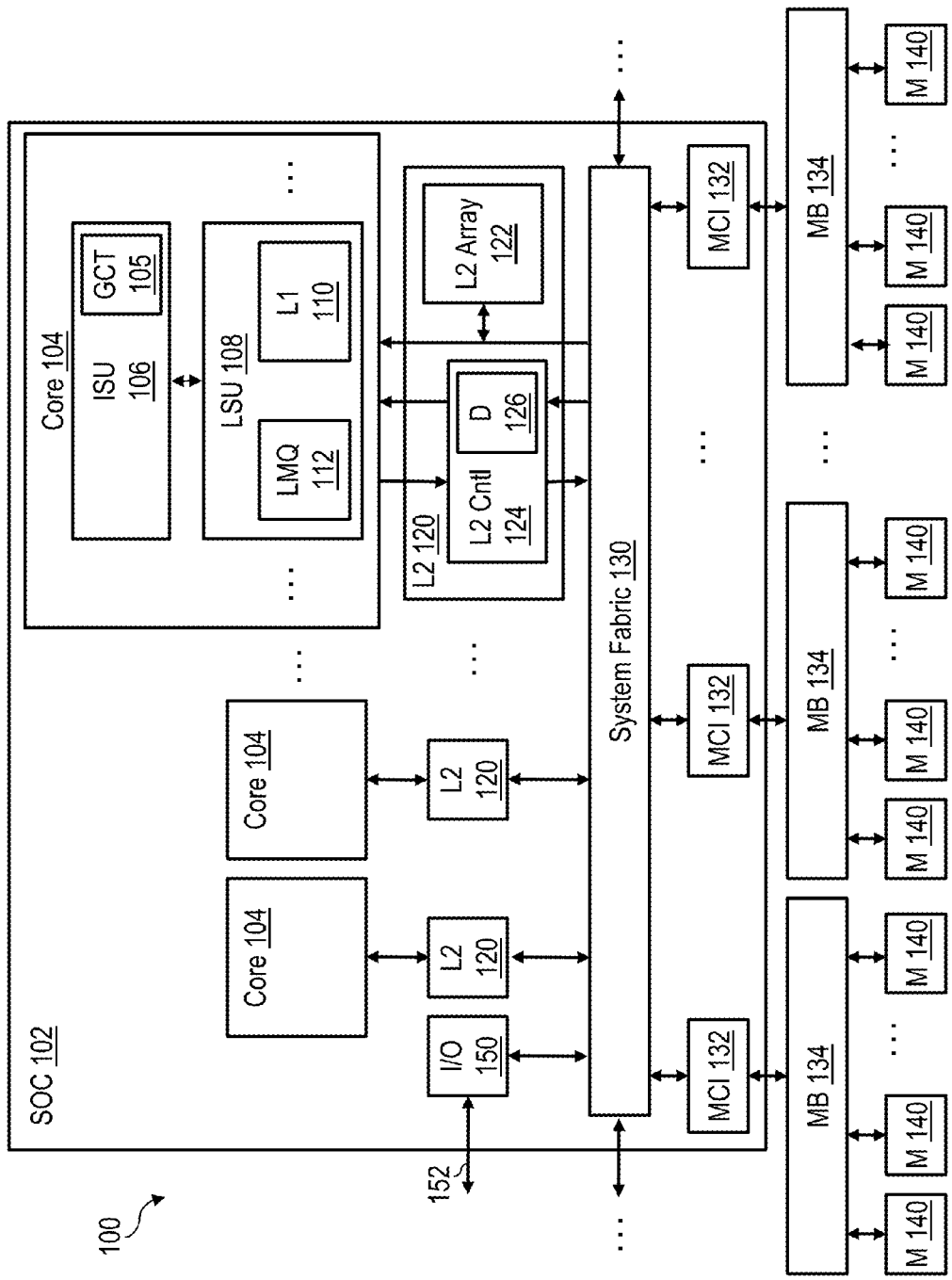
FIG. 1 is a high level block diagram of an exemplary data processing system in accordance with one embodiment.

With reference now to the figures and with particular reference to FIG. 1, there is illustrated a high level block diagram of an exemplary data processing system 100 that is one of the numerous possible embodiments of a data processing system in accordance with the principles and techniques disclosed herein. Data processing system 100 may be implemented, for example, with one of the IBM Power servers, a product line of International Business Machines Corporation of Armonk, N.Y.

In the depicted embodiment, data processing system 100 includes at least one system-on-a-chip (SOC) 102, and as indicated by elliptical notation, possibly numerous SOCs 102 coupled by system fabric 130 integrated within the SOCs 102. Each SOC 102 is preferably realized as a single integrated circuit chip having a substrate in which semiconductor circuitry is fabricated as is known in the art. Each SOC 102 includes multiple processor cores 104 that independently process instructions and data. In some embodiments, processor cores 104 further support simultaneous multithreading in which multiple independent threads are concurrently executed. Each processor core 104 includes an instruction sequencing unit (ISU) 106 for fetching instructions, ordering the instructions for execution, and completing the instructions by committing the results of execution to the architected state of the processor core 104. As discussed further below, ISU 106 completes instructions by reference to a global completion table (GCT) 105.

Each processor core 104 further includes one or more execution units for executing instructions such as, for example, fixed and floating point arithmetic instructions, logical instructions, and load-type and store-type instructions that respectively request read and write access to a target memory block in the coherent address space of data processing system 100. In particular, the execution units include a load-store unit (LSU) 108 that executes the load-type and store-type instructions to compute target addresses of read and write memory access operations. LSU 108 includes a store-through level one (L1) cache 110 from which read memory access operations can be satisfied, as well as a load miss queue (LMQ) 112 that tracks read memory access operations that miss in L1 cache 110.

The operation of each processor core 104 is supported by a multi-level hierarchical memory subsystem having at its lowest level one or more shared system memories 140 (e.g., bulk DRAM) generally accessible by any of processor cores 104 in any of the SOCs 102 in data processing system 100, and at its upper levels, one or more levels of cache memory. As depicted, SOC 102 includes one or more (and preferably multiple) memory channel interfaces (MCIs) 132, each of which supports read and write accesses to an associated collection of system memories 140 in response to memory access operations received via system fabric 130 from processor cores 104 in the same SOC 102 or other SOCs 102. In the depicted embodiment, each MCI 132 is coupled to its associated collection of system memories 140 via an external memory buffer (MB) 134.

In the illustrative embodiment, the cache memory hierarchy supporting each processor core 104 of SOC 102 includes the store-through level one (L1) cache 110 noted above and a private store-in level two (L2) cache 120. As shown, L2 cache 120 includes an L2 array 122 and an L2 controller 124, which includes control logic and a directory 126 of contents of L2 array 122. L2 controller 124 initiates operations on system fabric 130 and/or accesses L2 array 122 in response to memory access (and other) requests received from the associated processor core 104. In an embodiment in which a snoop-based coherency protocol is implemented (as will be hereafter assumed), L2 controller 124 additionally detects operations on system fabric 130, provides appropriate coherence responses, and performs any accesses to L2 array 122 required by the snooped operations. Although the illustrated cache hierarchy includes only two levels of cache, those skilled in the art will appreciate that alternative embodiments may include additional levels (L3, L4, etc.) of private or shared, on-chip or off-chip, in-line or lookaside cache, which may be fully inclusive, partially inclusive, or non-inclusive of the contents the upper levels of cache.

SOC 102 further includes one or more integrated I/O (input/output) interfaces 150 supporting I/O communication via one or more external communication links 152 with one or more I/O controllers, such as PCI host bridges (PHBs), InfiniBand controllers, FibreChannel controllers, etc. Those skilled in the art will appreciate that data processing system 100 can include many additional or alternative components, which are not necessary for an understanding of the invention set forth herein are accordingly not illustrated in FIG. 1 or discussed further herein.

As will be appreciated, with current technologies the memory access latency experienced by a processor core 104 for requests serviced by a system memory 140 can be significantly greater than that for memory access requests serviced by an L2 cache 120. For example, in one embodiment, L1 cache 110 can be accessed in a single processor core clock cycle, a local L2 cache 120 can be accessed in approximately 3-5 processor core clock cycles, and off-chip system memories 140 can be accessed in 300-400 processor core clock cycles. In order to reduce the effective memory access latency of read memory access operations serviced by a system memory 140, an SOC 102 can selectively enable data error speculation for selected read memory access operations initiated on system fabric 130. In response to a read memory access operation for which data error speculation is enabled, at least some of the data requested by the read memory access operation can be returned to the requesting processor core 104 by the memory subsystem and processed by the processor core 104 in advance of an indication of whether the requested data contained an error. Thus, error detection processing within the memory hierarchy can be "posted" (i.e., deferred) to enable data transmission to precede an error determination. One implementation of data error speculation by a processor core 104 and the associated posted error detection processing in the memory subsystem is described below.

Figure 2:
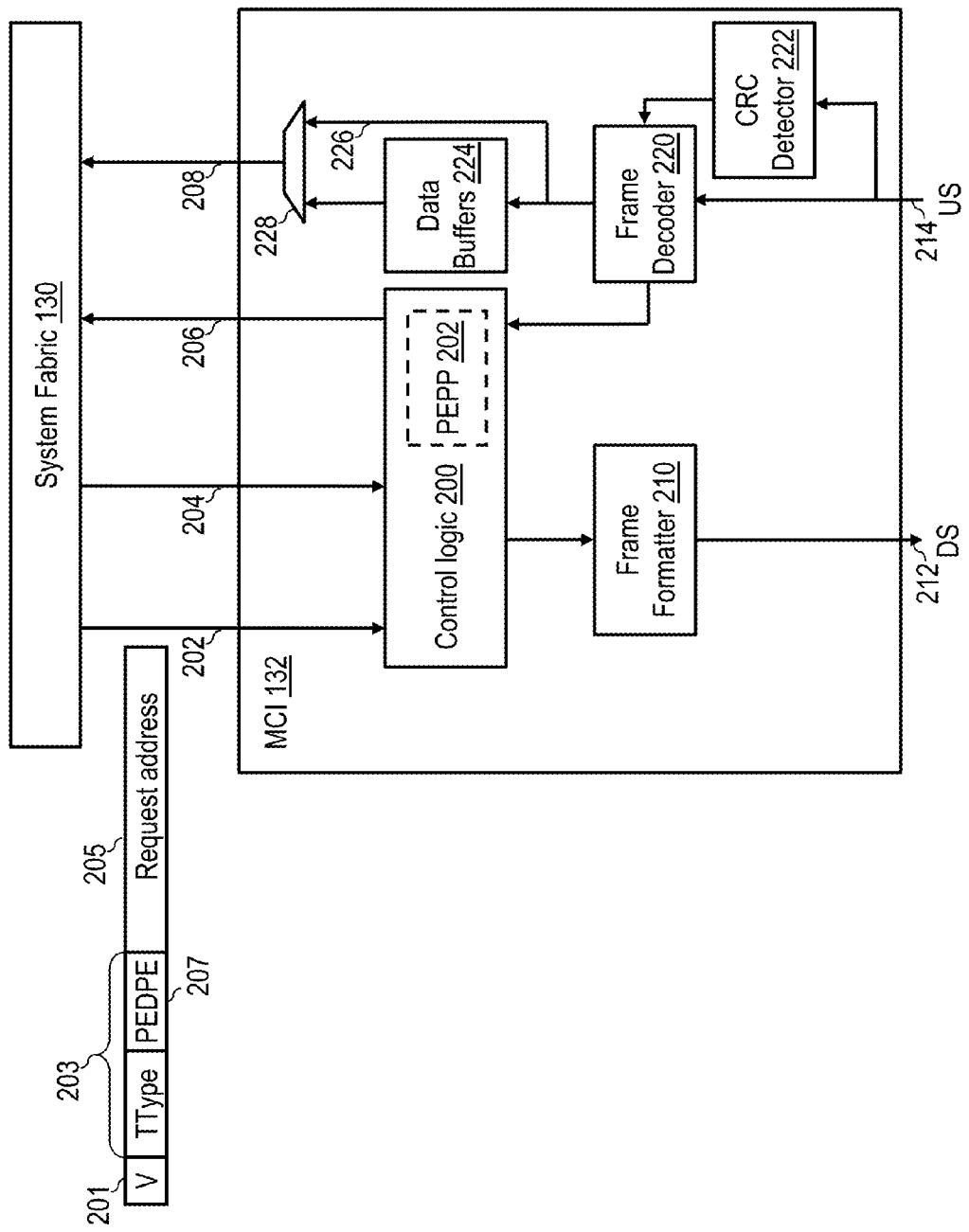
FIG. 2 is a more detailed view of a memory controller (MC) of FIG. 1 in accordance with one embodiment.

Referring now to FIG. 2, there is depicted a more detailed view of one of the memory channel interfaces (MCIs) 132 of FIG. 1 in accordance with one embodiment. In the depicted embodiment, MCI 132 is coupled to system fabric 130 via downstream (i.e., toward memories 140) request and data interfaces 202 and 204 and upstream (i.e., toward system fabric 130) control and data interfaces 206 and 208. Request interface 202 receives from system fabric 130 read and write memory access requests of various operations, where each memory access request includes, for example, a valid field 201 indicating whether the memory access request of the operation is valid, a transaction type (TType) field 203 indicating the type of the memory access request (e.g., a read or a write), and a request address field 205 specifying the target address of the memory access request. In one embodiment, the TType field 203 for read memory access requests includes a posted error detection processing enable (PEDPE) bit 207 that is set (e.g., to '1') by the SOC 102 initiating the read memory access request to indicate that posted error detection processing is enabled for the read memory access request and that is reset (e.g., to '0') by the SOC 102 to indicate that posted error detection processing is inhibited. Data interface 204 receives from system fabric 130 data to be written to the associated collection of system memories 140 by write memory access requests.

MCI 132 includes control logic 200 that controls access to the associated collection of system memories 140 in response to memory access operations received view system fabric 130. In response to receipt of the request of a memory access operation on system fabric 130, control logic 200 determines by reference to valid field 201 and request address field 205 of the memory access request whether or not the memory access request is valid and specifies a target address within the collection of system memories 140 controlled by that MCI 132. If not, the memory access request is dropped. If, however, control logic 200 validates and qualifies the memory access request as directed to one of its associated system memories 140, control logic 200 transmits the memory access request (including for read memory access requests, PEDPE bit 207) and associated write data, if any, to frame formatter 210.

In at least some embodiments, control logic 200 includes an optional posted error processing predictor (PEPP) 202 that, based on historical data for memory access requests targeting the associated collection of system memories 140, predicts posted error detection processing is likely to succeed without detection of an error in the target memory block. In response to PEPP 202 determining that posted error detection processing is not likely to succeed for a particular read memory access request without detection of an error in the target memory block, control logic 200 resets PEPDE bit 207 for that particular read memory access request. Further details regarding an embodiment of PEPP 202 and its operation and provided below with reference to FIGS. 5-6.

Frame formatter 210, in response to receipt of the memory access request and write data, if any, formats the memory access request and write data, if any, into one or more frames and transmits those frame(s) to a memory buffer 134 coupled to SOC 102 via a downstream memory buffer interface 212. As will be appreciated, the frame format may vary widely between implementations based on a variety of factors including the pin counts available to implement downstream memory buffer interface 212 and the corresponding upstream memory buffer interface 214.

As further shown in FIG. 2, MCI 132 additionally includes a frame decoder 220 that receives frames from a memory buffer 134 coupled to SOC 102 via upstream memory buffer interface 214. Frame decoder 220 decodes such frames to extract data being transmitted upstream and associated control information. Cyclic Redundancy Check (CRC) detector 222 additionally performs a CRC (e.g., parity check or other CRC processing) on the frame in parallel with the processing performed by frame decoder 220 to verify that the frame has not been corrupted in transmission from memory buffer 134. In response to CRC detector 222 signaling that the frame has not been corrupted, frame decoder 220 forwards control information extracted from the frame, such as a data tag identifying the operation to which the data belongs, a data error indicator indicating whether or not the data contains an error, and (as described further below) an posted status indicator providing an indication regarding whether the data is part of a data transfer subject to posted error detection processing. Control logic 200 receives the control information extracted by frame decoder 220 and forwards that control information to system fabric 130 via upstream control interface 206. MCI 132 additionally includes two data paths for upstream data extracted by frame decoder 220: (1) a fast path 226 selected for critical words of target memory blocks, data transfers subject to posted error detection processing, and other high priority data transfers, and (2) a buffered data path including data buffers 224 for buffering low priority data. A multiplexer 228 applies a selected arbitration policy to select data from one of the two data paths for transmission on system fabric 130, but to minimize access latency, preferentially selects data from fast path 226 without starving out the buffered data path.

Figure 3:
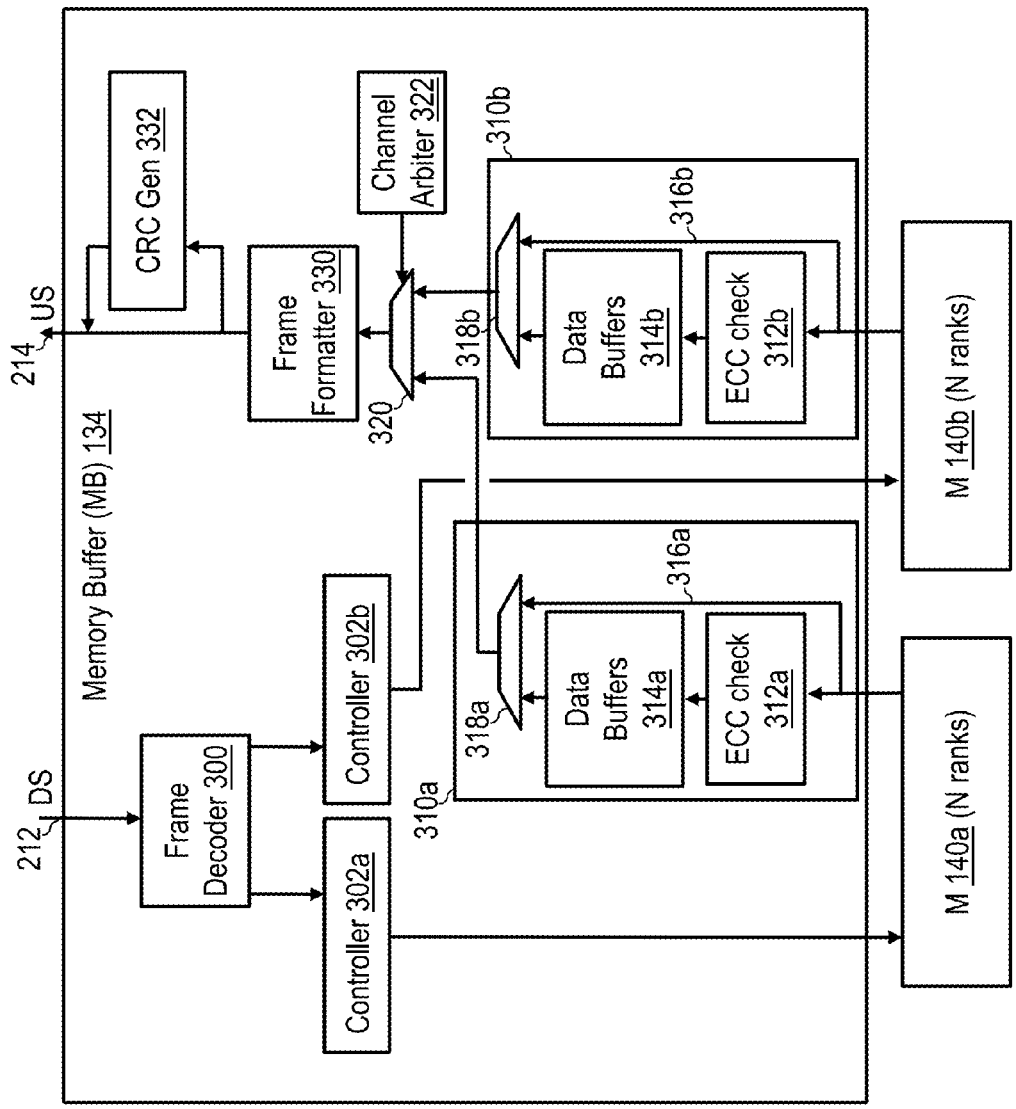
FIG. 3 is a more detailed view of a memory buffer (MB) of FIG. 1 in accordance with one embodiment.

With reference now to FIG. 3, there is illustrated a more detailed view of a memory buffer 134 of FIG. 1 in accordance with one embodiment. In the illustrated embodiment, memory buffer 134 includes a frame decoder 300 that receives frames from MCI 132 via downstream memory buffer interface 212. Frame decoder 300 decodes the frames and determines to which of multiple attached system memories 140 each memory access request is directed. Thus, in the depicted example in which the attached system memories 140 include at least system memories 140a and 140b, frame decoder 300 determines whether memory access requests specify a target address assigned to system memory 140a or to system memory 140b, and accordingly forwards the memory access requests to controller 302a or controller 302b for servicing. Controllers 302a and 302b service memory access request received from controllers 302a, 302b by directing appropriate read or write accesses to the associated one of system memories 140a and 140b.

Memory buffer 134 additionally includes a respective read channel 310a, 310b for each attached system memory 140a, 140b. Each of read channels 310a, 310b includes an ECC check circuit 312a, 312b that performs error detection and error correction processing, preferably on all data read from the associated one of system memories 140a, 140b. Each of read channels 310a, 310b further includes a fast path 316a, 316b by which selected data granules read from the associated one of system memories 140a, 140b are also permitted to bypass ECC check circuit 312a, 312b in order to decrease memory access latency. For example, in one embodiment in which a memory block is communicated from system memories 140 to processor cores 104 in four granules, only the first three of the four data granules are permitted to bypass the ECC check circuit 312, while all four granules are also always routed through ECC check circuit 312 so that a data error indicator indicating whether or not the memory block contains an error can conveniently be forwarded upstream with the last granule. The first three of the four data granules that are also routed through the ECC check circuit 312 are then discarded since they were already forwarded via the fast path 316a, 316b. To permit data transmitted via fast path 316a, 316b to be forwarded with minimal latency, each of read channels 310a, 310b additionally includes data buffers 314a, 314b for buffering lower priority data output by ECC check circuit 312a, 312b as needed. A multiplexer 318a, 318b within each read channel 310a, 310b applies a selected arbitration policy to select data from data buffers 314a, 314b and fast path 316a, 316b for forwarding. The arbitration policy preferentially selects data from fast path 316a, 316b without starving out the buffered data path.

In a preferred embodiment, each of read channels 310a, 310b routes data associated with read memory access requests for which posted error detection processing is inhibited only by the buffered data path including ECC check circuit 312 and data buffers 314, and, if scheduling permits, routes data associated with read memory access requests for which posted error detection processing is enabled via both the buffered data path and fast path 316. Thus, in contrast to prior art systems, forwarding of a target memory block by read channels 310a, 310b is not dependent on a determination that the entire target memory block is error-free. Instead, for a read memory access request for which posted error detection processing is enabled by PEDPE bit 207, a read channel 310 forwards at least one data granule of the target memory block received from system memory 140 (e.g., the data granule containing the critical word) via fast path 316 as soon as the data granule is available. After all data granules of the target memory block have been received from system memory 140, the read channel 310 performs posted error detection processing on all of the data granules utilizing its ECC check circuit 312 to determine whether the target memory block contains an error, and if possible (e.g., if the error is a single symbol error and posted data error correction was not performed on the target memory block), to correct the error.

As discussed further below with reference to FIG. 7, in addition to the granules of the target memory block, read channel 310 preferably forwards a posted status indicator with each data granule of the target memory block that indicates whether or not the associated data granule was subject to posted error detection processing. Read channel 310 also preferably forwards, for example, with at least the final granule of the target memory block (and possibly with each data granule), a data error indicator that indicates whether or not an error has been detected for the target memory block. The data error indicator can additionally be set in response to detection of an error (e.g., CRC error) occurring as the data flows upstream.

The read channels 310a, 310b of memory buffer 134 are all coupled to inputs of a multiplexer 320 controlled by a channel arbiter 322. Channel arbiter 322 applies a desired arbitration policy (e.g., modified round robin) to generally promote fairness between read channels 310a, 310b, while giving preference to data transfers with posted error detection processing. Each data transfer selected by channel arbiter 322 is received by frame formatter 330, which formats the data transfer into one or more frames and transmits those frame(s) to the MCI 132 coupled to memory buffer 134 via an upstream memory buffer interface 214 after a check value is appended by CRC generator 332.

Figure 4:
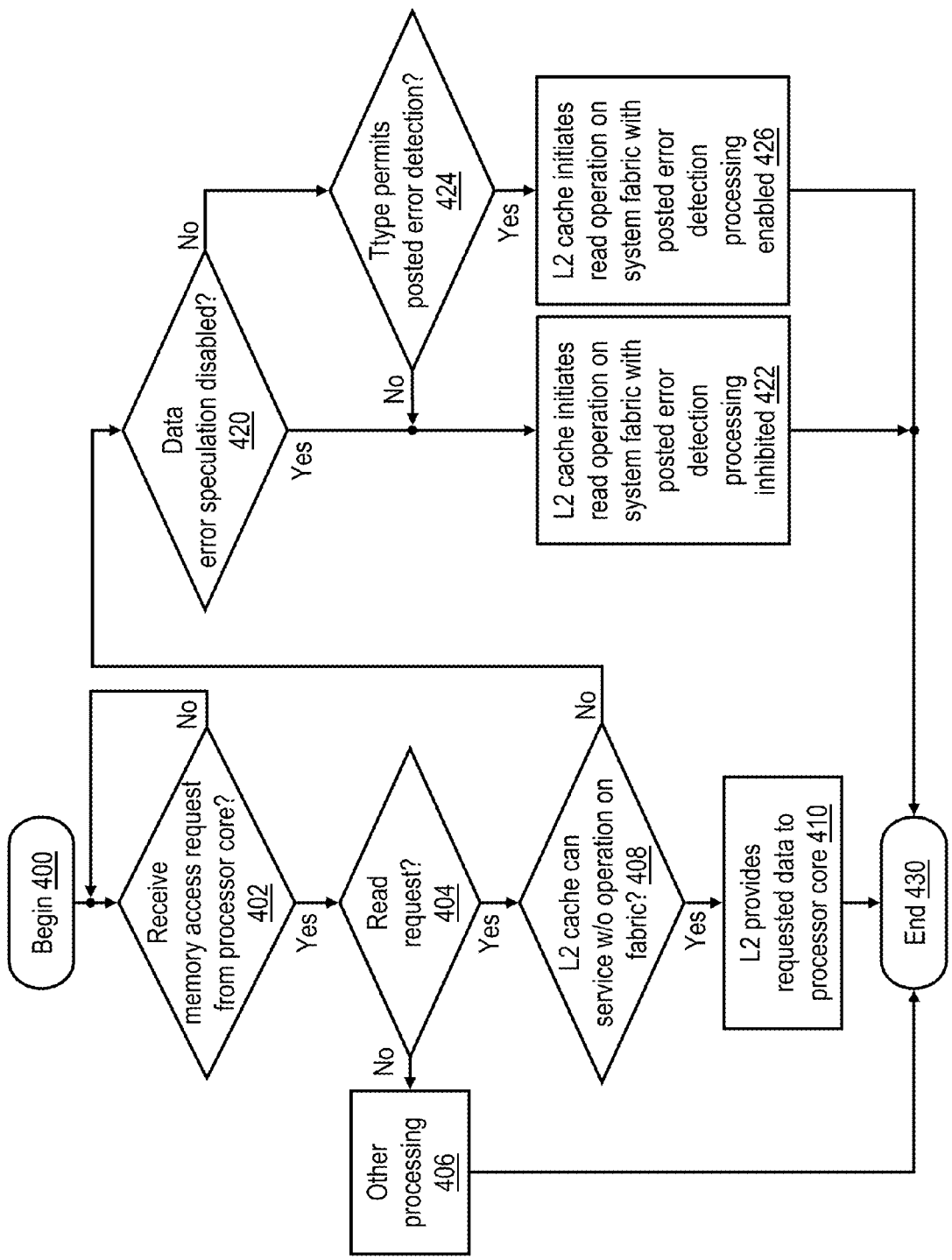
FIG. 4 is a high level logical flowchart of an exemplary process for determining whether posted error detection processing is to be enabled for a read memory access operation in accordance with one embodiment.

Referring now to FIG. 4, there is depicted a high level logical flowchart of an exemplary process by which a SOC 102 determines whether posted error detection processing is to be enabled for a read memory access operation in accordance with one embodiment. The process begins at block 400 and then proceeds to block 402, which illustrates L2 controller 124 awaiting receipt of a memory access request from the associated processor core 104. As indicated by blocks 404 and 406, if the memory access request is a write memory access request, L2 controller 124 performs other, possibly conventional processing. Thereafter, the process terminates at block 430.

Returning to block 404, in response to receipt by L2 controller 124 of a read memory access request from the associated processor core 104, the process proceeds from block 404 to block 408, which illustrates L2 controller 124 determining whether or not L2 cache 120 can service the read memory access request without initiating an operation on system fabric 130, for example, by reading directory 126 to determine a coherence state associated with the target address of the read memory access request. In response to a determination that L2 cache 120 can service the read memory access request without initiating a corresponding operation on system fabric 130, L2 controller 124 directs L2 cache 120 to supply the target memory block of the read memory access request to the processor core 104 from L2 array 122 (block 410). Thereafter, the process depicted in FIG. 4 ends at block 430.

Referring again to block 408, if L2 controller 124 determines that L2 cache 120 cannot service the read memory access request without initiating an operation on system fabric 130, L2 controller 124 further determines at block 420 whether or not the requesting processor core 104 indicated that data error speculation is disabled, for example, for this particular read memory access request, for this thread of the processor core 104, or for all threads of execution of the processor core 104. In one embodiment, the determination illustrated at block 420 can be made by reference to a data error speculation field within the read memory access request. In response to determining at block 420 that data error speculation is disabled, L2 controller 124 initiates a read memory access operation on system fabric 130 with PEDPE bit 207 reset to inhibit posted data error processing for the target memory block (block 422). Thereafter, the process shown in FIG. 4 ends at block 430.

Returning to block 420, if L2 controller 124 determines that data error speculation is not disabled, L2 controller 124 also determines at block 424 whether the posted data error detection is permitted for this read memory access request based on the transaction type (TType) of the read memory access request. Thus, L2 controller 124 implements a policy by which posted data error detection is permitted for certain types of read memory access requests (e.g., data load, atomic load-and-reserve, and data prefetch requests), but is not for permitted for other read memory access requests (e.g., instruction load, address translation load and read-with-intent-to-modify requests). In other words, despite the fact that data error speculation is not disabled for a read memory access request by the requesting processor core 104, L2 controller 124 may nevertheless inhibit posted error detection processing for selected read memory access requests, as illustrated in FIG. 4 by the process proceeding from block 424 to previously described block 422 in response to a negative determination at block 424. However, in response to an affirmative determination at block 424, L2 controller 124 initiates a read memory access operation on system fabric 130 with PEDPE bit 207 set to enable posted error detection processing for the target memory block. It should be noted that the read memory access operation initiated at block 426 may or may not be serviced with posted error detection processing despite the setting of PEDPE bit 207 by L2 controller 124. In a majority of cases, the read memory access operation will simply be serviced by another L2 cache 120 that snoops the read memory access operation and supplies the target memory block. Further, in other cases in which the read memory access operation is serviced by memory controller 132, a memory controller 132 or memory buffer 134 may, in view or scheduling considerations or PEPP 202 indicating a likelihood of detection of a data error in the target memory block, elect not to perform posted error detection processing, but to instead perform error detection processing prior to sourcing any granule of the target memory block. Following block 426, the process shown in FIG. 4 ends at block 430.

Upon return of data granules of the target memory block from the memory subsystem in response to the read memory access operation on system fabric 130, L2 controller 124 preferably places the data granules of the target memory block in L2 array 122. However, L2 controller 124 marks the data granules as invalid in directory 126 unless and until L2 controller 124 receives confirmation from the memory subsystem that the entire memory block is free of data errors.

Figure 5:
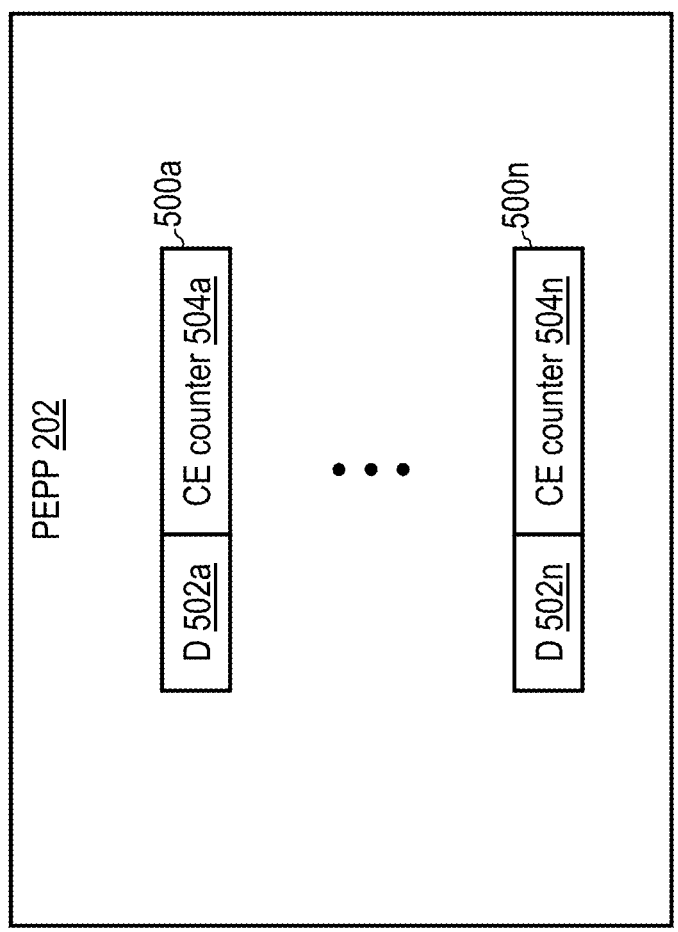
FIG. 5 is a more detailed view of an optional posted error processing predictor (PEPP) in the control logic of a memory controller in accordance with one embodiment.

With reference now to FIG. 5, there is illustrated a more detailed view of optional PEPP 202 in control logic 200 of MCI 132 in accordance with one embodiment.

In large scale commercial embodiments of data processing system 100 employing current memory technology, system memories 140 are typically implemented in bulk DRAM due in large part to the low cost of DRAM relative to competing memory technologies. In such embodiments, each of system memories 140 preferably includes multiple ranks of DRAM, with each rank comprising multiple DRAM chips. Real addresses are assigned to the DRAM chips such that memory blocks are each "striped" across a rank, with each DRAM chip in a given rank sourcing a portion of an accessed memory block.

Assuming this construction of system memories 140, PEPP 202 includes a plurality of entries 500a-500n, each corresponding to a rank of system memory 140 controlled by MCI 132. Each entry 500 includes a chip disable field 502, which is set (e.g., by system firmware) if any of the DRAM chips in the corresponding rank fails (e.g., experiences over a threshold number of uncorrectable errors (UEs)). Each of entries 500a-500n additionally includes a respective one of correctable error (CE) counters 504a-504n. In at least one embodiment, PEPP 202 increments the relevant CE counter 504 each time a data error is reported to control logic 200 by frame decoder 220, and periodically resets all CE counters 504a-504n at regular intervals. As indicated below with reference to FIG. 6, PEPP 202 preferably causes control logic 200 to inhibit data error detection speculation for any rank of system memory 140 for which the associated one of chip disable fields 502a-502n is set or for which the associated one of CE counters 504a-504n has a value satisfying (e.g., exceeding) a CE threshold.

Figure 6:
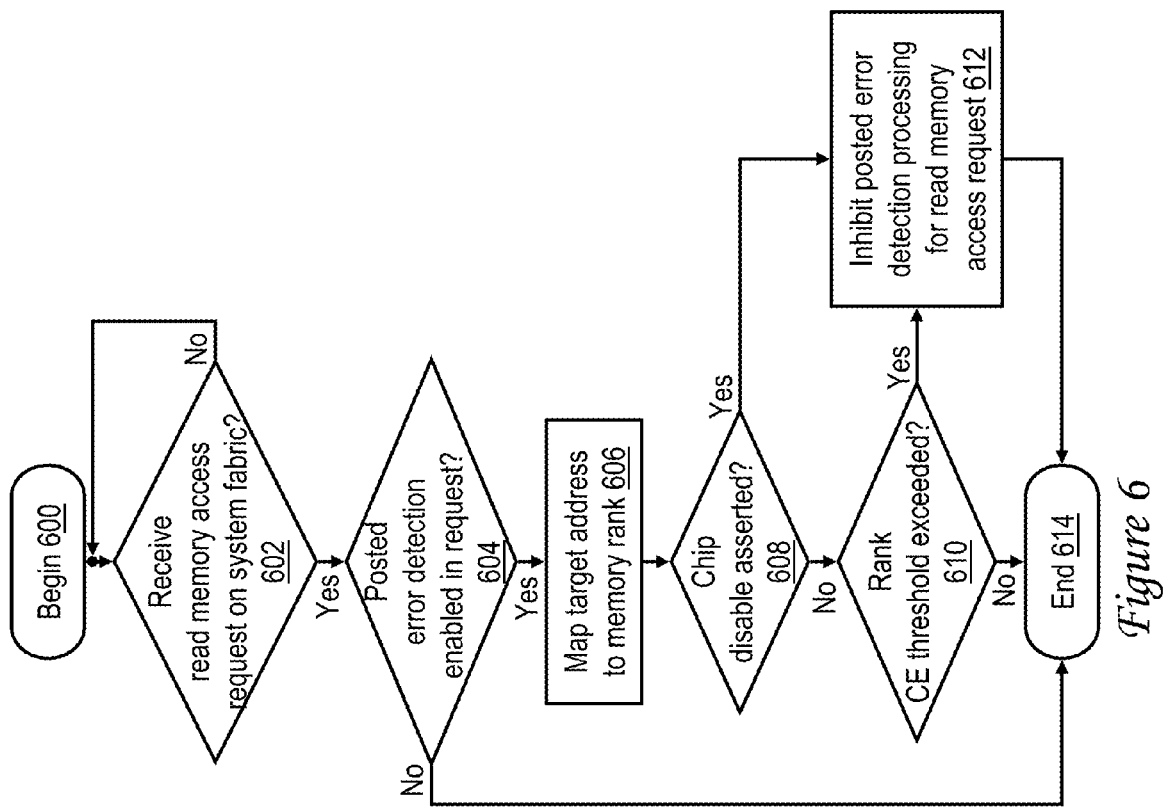
FIG. 6 is a high level logical flowchart of an exemplary method by which the PEPP determines whether to inhibit posted error detection processing for a read memory access request based on historical information in accordance with one embodiment.

Referring now to FIG. 6, there is depicted a high level logical flowchart of an exemplary method by which PEPP 202 determines whether to inhibit posted error detection processing for a read memory access request in accordance with one embodiment. The illustrated process begins at block 600 and then proceeds to block 602, which illustrates PEPP 202 awaiting receipt by control logic 200 of a read memory access request from system fabric 130. In response to receipt by control logic 200 of read memory access request from system fabric 130, PEPP 202 determines whether or not PEDPE bit 207 indicates that posted data error detection is enabled for the read memory access request. If not, the process shown in FIG. 6 ends at block 614. If, however, PEPP 202 determines at block 604 that PEDPE bit 207 of the read memory access request indicates that posted error detection processing is enabled for the read memory access request, the process proceeds to block 606.

Block 606 depicts PEPP 202 mapping the target address specified by request address field 205 to a particular memory rank among the memory ranks in the collection of system memories 140 controlled by MCI 132. The mapping depicted at block 606 can be performed, for example, utilizing an address transformation function (e.g., a modulo function) or a base address register facility. Based on the determined rank of system memory 140, PEPP 202 determines at blocks 608 and 610 whether the associated one of chip disable fields 502a-502n is set or whether the associated one of CE counters 504a-504n has a value satisfying (e.g., exceeding) a CE threshold. In response to negative determinations at blocks 608 and 610, the processing performed by PEPP 202 ends at block 614. However, in response to PEPP 202 determining that the associated one of chip disable fields 502a-502n is set or that the associated one of CE counters 504a-504n has a value satisfying a CE threshold, PEPP 202 modifies the read memory access request (e.g., by resetting PEDPE bit 207) to inhibit posted error detection processing for the memory access request (block 612). Thereafter, the process depicted in FIG. 6 ends at block 614.

Figure 7:
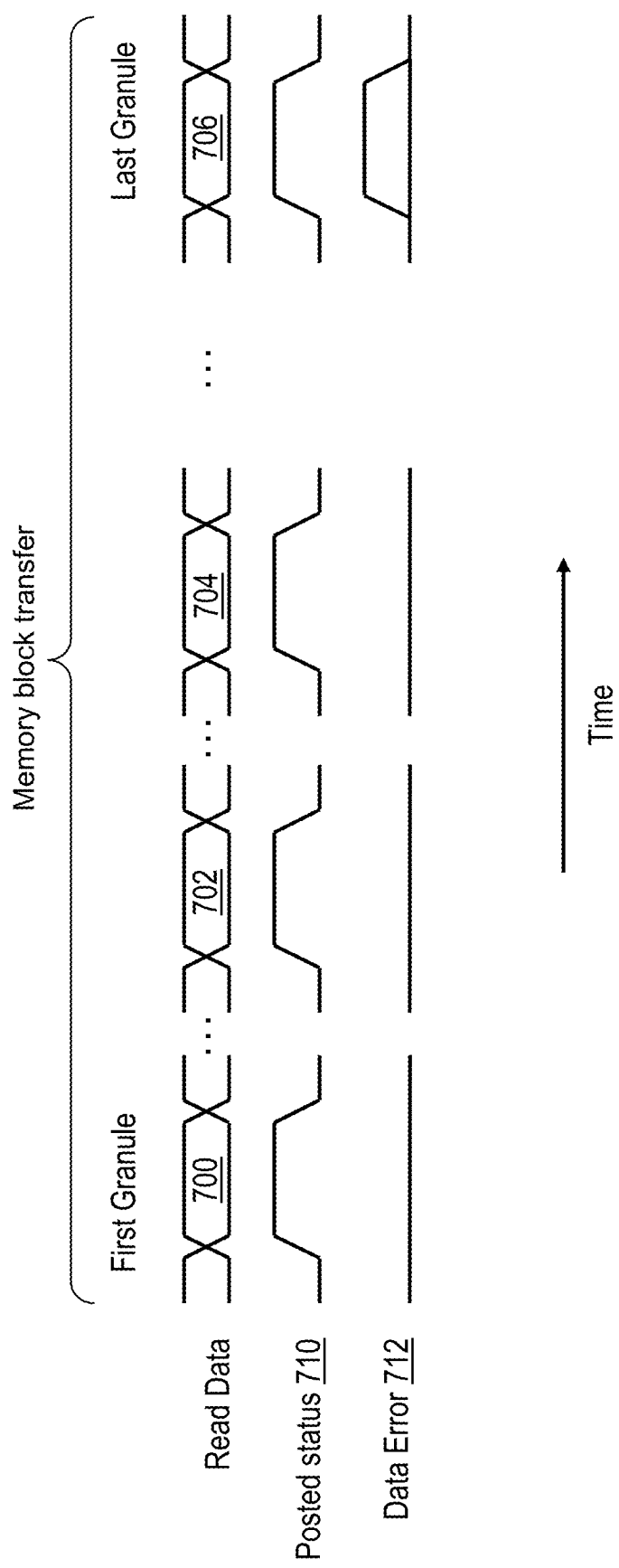
FIG. 7 is a timing diagram of a read access to a memory block in accordance with one embodiment.

With reference now to FIG. 7, a timing diagram illustrating the communication of a memory block and associated control signals from a memory buffer 134 to a processor core 104 in response to a read memory access request is given. In the depicted embodiment, memory buffer 134 communicates the memory block, which may have a size, for example, of 128 bytes, in four granules (or beats) 700, 702, 704 and 706, for example, of 32 bytes each. The first granule 700, which preferably includes the critical word (e.g., 8 bytes) originally requested by the load-type instruction of the processor core 104, is transmitted by memory buffer 134 in advance of the posted error detection processing performed by the ECC check circuit 312. Depending on the interface and memory technologies employed and scheduling considerations within the memory subsystem and at the system fabric 130, first granule 700 can be received by the requesting processor core 104 significantly earlier than last granule 706, with the intervening interval amounting to 10% or more of the overall memory access latency of the target memory block (e.g., 40 processor core clock cycles out of an overall memory access latency of 300 processor core clock cycles). As a consequence, the requesting processor core 104 is permitted to speculatively execute one or more instructions that are dependent upon the memory block prior to receipt by the processor core 104 of last data granule 706, and as discussed below, even speculatively finish, prior to receipt by the processor core 104 of the last data granule 706, the load-type instruction that requested the memory block and zero or more of the instructions dependent on the target memory block. (Note that FIG. 7 illustrates a specific embodiment in which the time interval between granules 704 and 706 is significantly longer that the time intervals between granules 702-704 because only the last granule 706 is delayed by ECC and CRC checks.)

In the depicted embodiment, the data transfer of each of granules 700-706 includes control information including a posted status indicator 710 and a data error indicator 712. Posted status indicator 710, which can be implemented as a single bit within the data transfer, is asserted to indicate that the associated one of granules 700-706 belongs to a memory block subject to posted data error processing. Data error indicator 712, which can also be implemented as a single bit within the data transfer, is asserted to indicate detection of an error in the memory block. In one embodiment, the data error indicator 712 for each of data granules 700, 702 and 704 other than last data granule 706 is deasserted, and the data error indicator 712 of the last data granule 706 is utilized to indicate whether or not a data error was detected in the target memory block by the relevant ECC check circuit 312 or CRC detector 222. In response to data error indicator 712 being reset to indicate the absence of a data error, the processor core 104 commits the execution results of the load-type instruction that requested the memory block and the speculatively executed dependent instructions to the architected state of the processor core 104. If, however, data error indicator 712 is set to indicate detection of a data error in the memory block, processor core 104 flushes the load-type instruction and the speculatively executed dependent instructions and any associated execution results and reexecutes the instructions. The processor core 104 preferably sends the read memory access request generated by reexecution of the load-type instruction to L2 cache 120 with an indication that data error speculation is disabled (see, e.g., block 420 of FIG. 4).

In the foregoing discussion, techniques have been described for reducing effective memory access latency of processor cores 104 to read data sourced from system memories 140 by applying posted error detection processing. As now described with reference to FIGS. 8-13, the benefits of posted error detection processing can be expanded by permitting data error speculation in processor cores 140, and further, by permitting processor cores 140 to speculatively finish instruction execution. It should be appreciated, however, that the techniques for speculatively finishing instruction execution can be employed independently of the posted error detection processing described herein.

Figure 8:
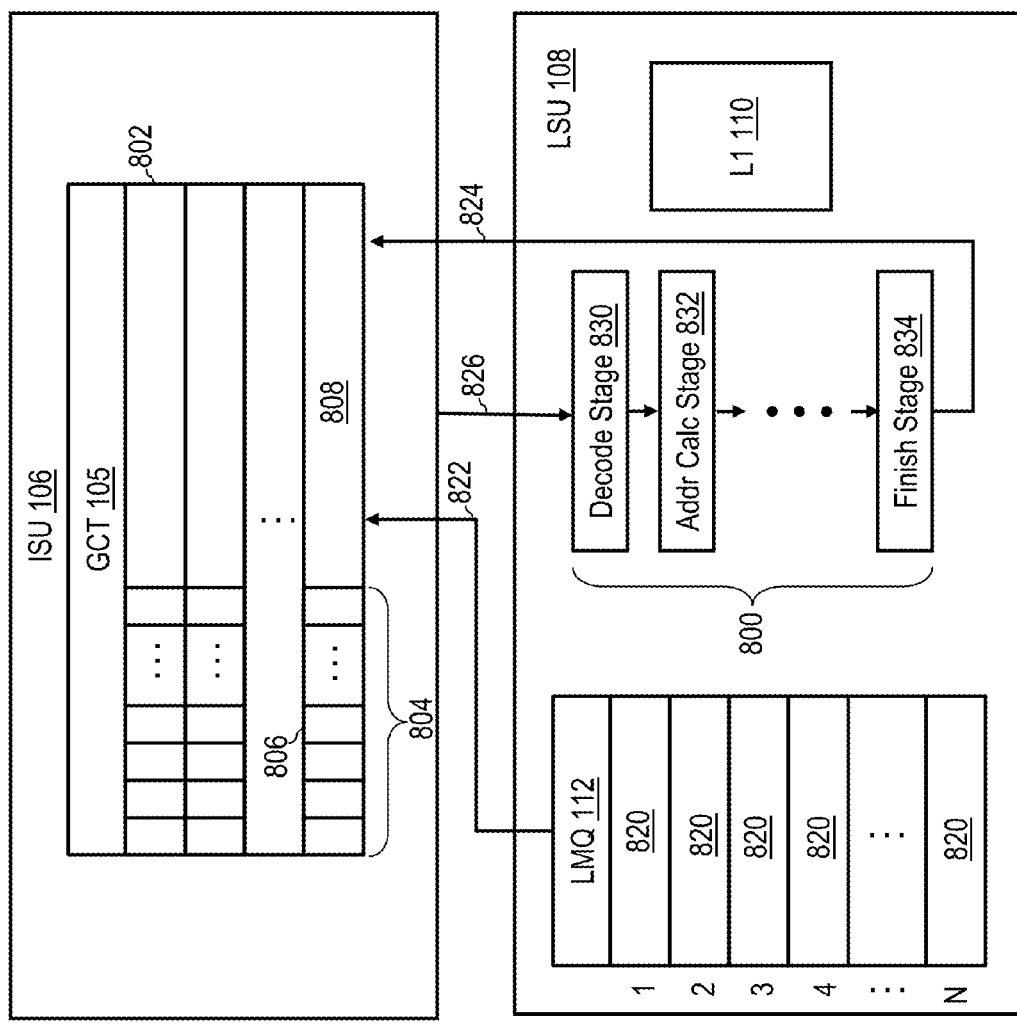
FIG. 8 is a more detailed view of a portion of a processor core in accordance with one embodiment.

Referring now to FIG. 8, there is depicted a more detailed view of a portion of a processor core 104 from FIG. 1 in accordance with one embodiment. As previously shown in FIG. 1, ISU 106 includes a GCT 105, and LSU 108, in addition to a multi-stage execution pipeline 800, includes an L1 cache 110 and LMQ 112. In the depicted embodiment, GCT 105 of ISU 106 includes completion logic and a plurality of table entries 802 each tracking a respective one of multiple instruction groups executed by the processor core 104 until the instructions within that instruction group are completed (also referred to as "retired") by committing the results of execution to the architected state (e.g., architected registers and state machines) of the processor core 104.

In the depicted embodiment, each table entry 802 includes an LMQ vector 804 for tracking data error speculation for instructions within each instruction group and an additional status section 808 for tracking the instructions IDs of the instruction group and the status of other conditions (e.g., branch speculation) on which completion of the instruction group depends. Each LMQ vector 804 comprises multiple LMQ bits 806 each corresponding to a respective one of the N (e.g., 32) entries 820 in LMQ 112. Thus, the first bit in LMQ vector 804 corresponds to the LMQ entry 820 assigned a LMQ tag of "1", the second bit in LMQ vector 804 corresponds to the LMQ entry 820 assigned a LMQ tag of "2", etc. An LMQ entry 820 is allocated to a load-type instruction in response to a miss of the load operation indicated by the load-type instruction in L1 cache 110 and is deallocated in response to return of the target memory block to LMQ 112.

GCT 105 is coupled to LMQ 112 by a deallocation bus 822 by which GCT 105 receives deallocation reports from LMQ 112. In addition, GCT 105 is coupled to execution pipeline 800 of LSU 108 by a finish bus 824 (and to the execution pipelines of other execution units of processor core 104 by other unillustrated finish buses) by which GCT 105 receives finish reports identifying instructions for which execution has finished. As discussed below, finish reports of at least load-type instructions executed by LSU 108 can be speculative in that a finish report can be sent prior to return of the complete target memory block of a load-type instruction to LSU 108.

Still referring to FIG. 8, LSU 108 is coupled to ISU 106 by a dispatch bus 826 by which execution pipeline 800 of LSU 108 receives memory access instructions for execution. In the depicted embodiment, execution pipeline 800 includes a plurality of stages of instruction processing circuitry including, for example, a decode stage 830, an address calculation stage 832 and a finish stage 834. In this example, finish stage 834 is a final stage of execution of load-type and store-type instructions within LSU 108. As described below, unlike conventional designs in which a load-type instruction stalls at finish stage 834 in response to a miss in L1 cache 110 until the target memory block of the load-type instruction is returned to LSU 108, GCT 105 enables LSU 108 to speculatively finish load-type instructions and remove them from finish stage 834 prior to return of the complete target memory block, freeing the resources of finish stage 834 for use by other instructions in the same and/or other thread(s).

Figure 9:
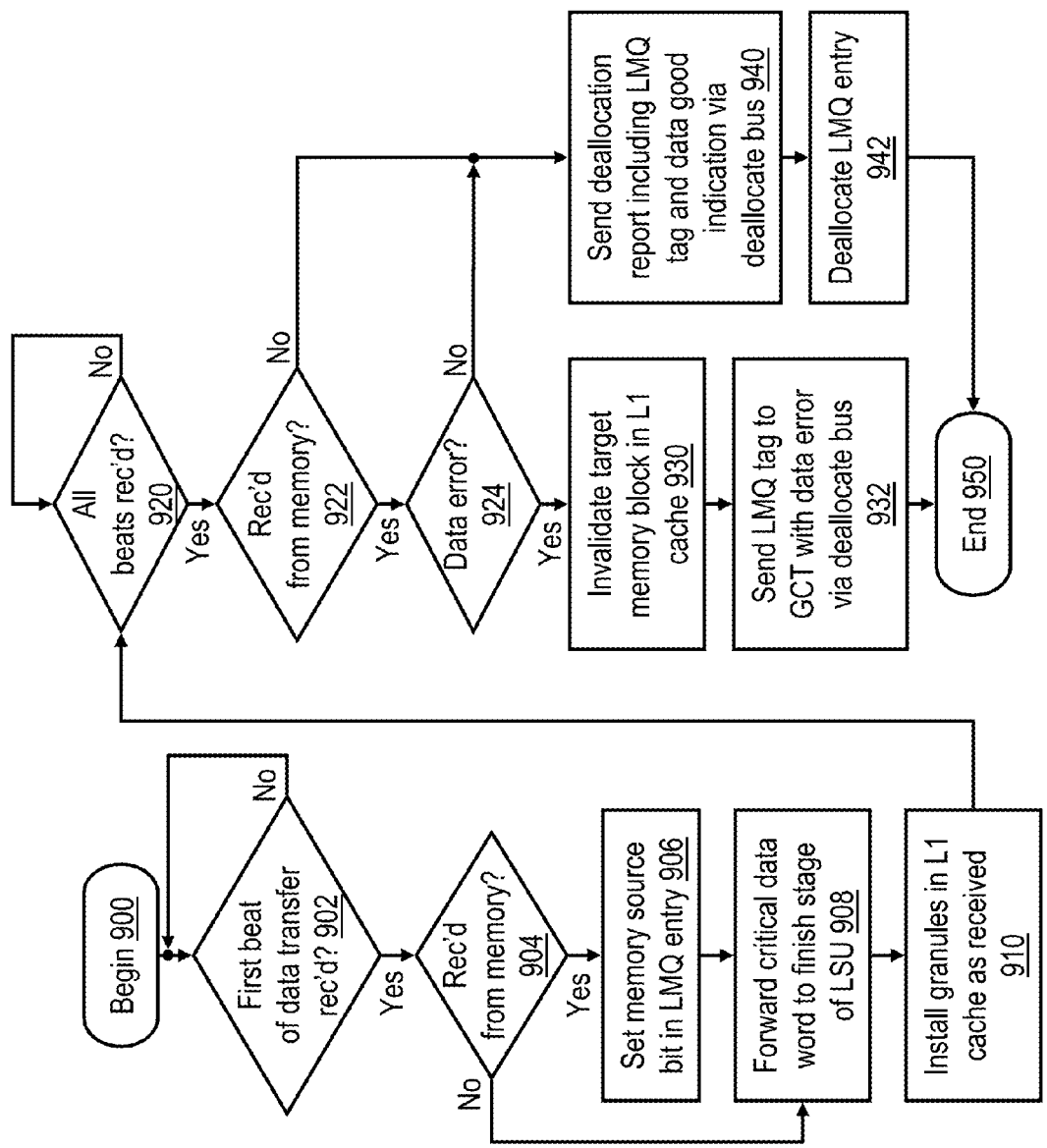
FIG. 9 is a high level logical flowchart of an exemplary process by which the load miss queue (LMQ) of FIG. 8 handles return of load data in accordance with one embodiment.

With reference now to FIG. 9, there is illustrated a high level logical flowchart of an exemplary process by which LMQ 112 handles the return of a target memory block of a read memory access operation in accordance with one embodiment. The process begins at block 900 and then proceeds to block 902, which depicts LMQ 112 awaiting return of the first beat (e.g., first granule 700 of FIG. 7) of the target memory block of a read memory access operation initiated on system fabric 130 in response to execution of a load-type instruction allocated an LMQ entry 820 upon missing in L1 cache 110. In response to receipt of the first granule of the target memory block of the read memory access operation from L2 cache 120, LMQ 112 determines at block 904 whether or not the target memory block is being sourced from a system memory 140 or from an L2 cache 120. The determination illustrated at block 904 can be made, for example, by reference to a memory source bit appended to the data granule by the local L2 cache 120 based on information gathered from the read memory access operation on system fabric 130. In response to a determination at block 904 that the memory block is being sourced from system memory 140, the process passes to block 908, which is described below. If, however, LMQ 112 determines at block 904 that the memory block is being sourced from a system memory 140, the process proceeds from block 904 to block 906.

Block 906 illustrates LMQ 112 determining which LMQ entry 820 is allocated to the load-type instruction that requested the target memory block and setting a memory source bit within that LMQ entry 820 to indicate that the target memory block is being sourced from system memory 140. The process proceeds from block 906 to block 908, which depicts LMQ 112 forwarding the critical data word (e.g., 8 bytes) of the first data granule of the memory block to finish stage 834 of execution pipeline 800 of LSU 108. In addition, as shown at block 910, LMQ 112 installs the first data granule and each succeeding data granule of the target memory block within L1 cache 110, enabling accesses to L1 cache 110 invoked by instructions dependent on the target memory block to begin execution and hit in L1 cache 110. It should be noted with respect to block 908 and 910 that in cases in which the memory block is sourced from system memory 140 with posted error detection processing, the critical data word supplied to finish stage 834 and the granules of the target memory block installed in L1 cache 110 are speculative.

As indicated at block 920, once all beats of the target memory block are received, LMQ 112 then determines at blocks 922-950 whether or not the LMQ entry 820 allocated to the load-type instruction that requested the target memory block can be deallocated and what type of deallocation report is to be sent to GCT 105. Specifically, LMQ 112 determines at block 922 whether or not the target memory block was sourced from a system memory 140. If not, the target memory block that was received is non-speculative, and LMQ 112 accordingly transmits a deallocation report including the LMQ tag of the relevant LMQ entry 820 and an asserted "data good" indication to GCT 105 via deallocation bus 822 (block 940). LMQ 112 additionally deallocates the LMQ entry 820, freeing it for allocation to another load-type instruction (block 942). Thereafter, the process illustrated in FIG. 9 terminates at block 950.

Returning to block 922, if LMQ 112 determines that the target memory block was sourced from one of system memories 140, LMQ 112 further determines at block 924 whether or not the target memory block contains a data error, for example, by reference to the data error indicator 712 transmitted with the last data granule (e.g., data granule 706 of FIG. 7) of the target memory block. If not, the process passes to blocks 940, 942 and 950, as described above. However, in response to a determination at block 924 that the target memory block contains a data error, LMQ 112 invalidates all granules of the target memory block in L1 cache 110 (block 930). In addition, at block 932, LMQ 112 transmits a report including the LMQ tag of the relevant LMQ entry 820 and a deasserted "data good" indication (i.e., a data error indication) to GCT 105 via deallocation bus 822 (block 932). In one embodiment, LMQ 112 does not deallocate the LMQ entry 820, however, but instead retains the allocation of the LMQ entry 820 to facilitate reissuance of the read memory access operation. Following block 932, the process illustrated in FIG. 9 terminates at block 950.

Figure 10:
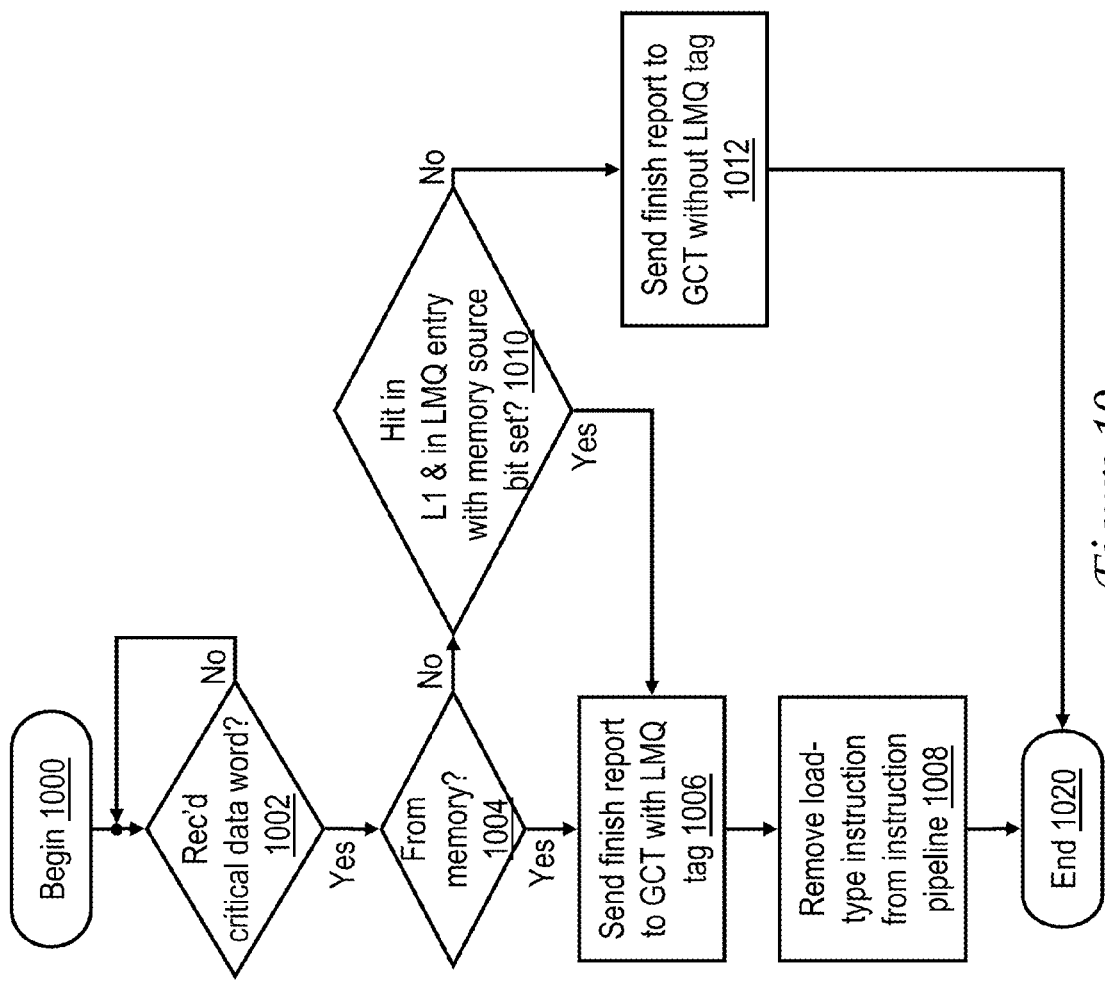
FIG. 10 is a high level logical flowchart of an exemplary process by which a finish stage of the load-store unit of FIG. 8 reports finish of a load-type instruction to the global completion table (GCT) in accordance with one embodiment.

Referring now to FIG. 10, there is depicted a high level logical flowchart of an exemplary process by which finish stage 834 of the LSU 108 reports finish of a load-type instruction to GCT 105 in accordance with one embodiment. The process begins at block 1000 and then proceeds to block 1002, which illustrates finish stage 834 of LSU 108 awaiting receipt of the critical data word of the target memory block requested by a load-type instruction. In response to receipt of the critical data word requested by the load-type instruction at finish stage 834, finish stage 834 determines at block 1004 whether or not the critical data word was sourced by one of system memories 140, for example, by reference to a memory source bit forwarded by LMQ 112 with the critical data word. If not, the process proceeds to block 1010, which is described below. In response to a determination that the critical data word was sourced from one of system memories 140 (and therefore possibly contains a data error), finish stage 834 sends a finish report for the load-type instruction to GCT that identifies the load-type instruction by its instruction ID and that identifies the LMQ entry 820 allocated to the load-type instruction by its LMQ tag. As described further below, the LMQ tag is utilized to initiate tracking by the GCT 105 of the load-type instruction and all dependent instructions for detection of a data error. Thereafter, LSU 108 removes the load-type instruction from instruction pipeline 800 such that instruction pipeline 800 retains no information regarding the load-type instruction (block 1008). Following block 1008, the process shown in FIG. 10 ends at block 1020.

Referring now to block 1010, for load-type instructions for which the critical data word is not sourced from one of system memories 140, finish stage 834 determines whether the load-type instruction is dependent on a target memory block that is still speculative (i.e., was sourced with posted error detection processing), for example, by determining that the load-type instruction received its critical data word from L1 cache 110 and the LMQ entry 820 allocated to the load-type instruction has its memory source bit set to indicate that the target memory block was sourced to L1 cache 110 by one of system memories 140. In response to an affirmative determination at block 1010, the process proceeds to blocks 1006 and 1008, which have been described. If, however, finish stage 834 makes a negative determination at block 1010, the load-type instruction is not subject to data error speculation, and finish stage 834 accordingly sends a finish report to GCT 105 without specifying an LMQ tag. Following block 1012, the process shown in FIG. 10 ends at block 1020.

It should be understood that the instruction finish process given in FIG. 10 permits an instruction (in this case a load-type instruction) that may depend on one or more high latency conditions (e.g., in this example, the return of data from one of system memories 140) tracked by a data structure (e.g., LMQ 112) to be speculatively finished prior to resolution of the condition(s) on which the instruction depends. This speculative finish is enabled by passing to GCT 105 an index into the data structure (e.g., the LMQ tag) to permit GCT 105 to track resolution of the high latency condition(s).

Figure 11:
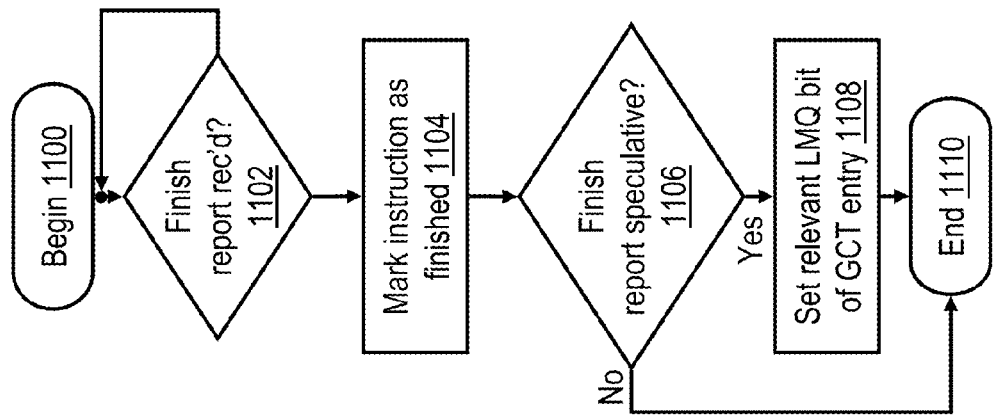
FIG. 11 is a high level logical flowchart of an exemplary process by which the GCT tracks speculatively finished instructions in accordance with one embodiment.

With reference now to FIG. 11, there is illustrated a high level logical flowchart of an exemplary process by which GCT 105 tracks finished load-type instructions (including speculatively finished load-type instructions) in accordance with one embodiment. The process begins at block 1100 and then proceeds to block 1102, which depicts GCT 105 awaiting receipt of a finish report from finish stage 834 of LSU 108 via finish bus 824. The finish report includes the instruction ID of the load-type instruction and, as described with reference to FIG. 10, will include a valid LMQ tag, if speculatively finished. In response to receipt of the finish report, GCT 105 marks the instruction as finished in the status section 808 of the appropriate GCT entry 802 (block 1104). In addition, GCT 105 determines at block 1106 whether or not the finish report was speculative, which in the described embodiment, comprises determining if the finish report received from finish stage 834 includes an LMQ tag identifying an LMQ entry 820 tracking an as yet incompletely satisfied read memory access operation. In response to a negative determination at block 1106, the process ends at block 1110. If, however, GCT 105 determines at block 1106 that the finish report was speculative, GCT 105 sets the LMQ bit 806 identified by the LMQ tag in the LMQ vector 804 of the GCT table entry 802 tracking the speculatively finished load-type instruction. Thus, GCT 105 assumes tracking of the speculative status of the load-type instruction to enable LSU 108 to free the resources of instruction pipeline 800 allocated to the load-type instruction. Following block 1108, the process shown in FIG. 11 ends at block 1110.

Figures 12, 13:
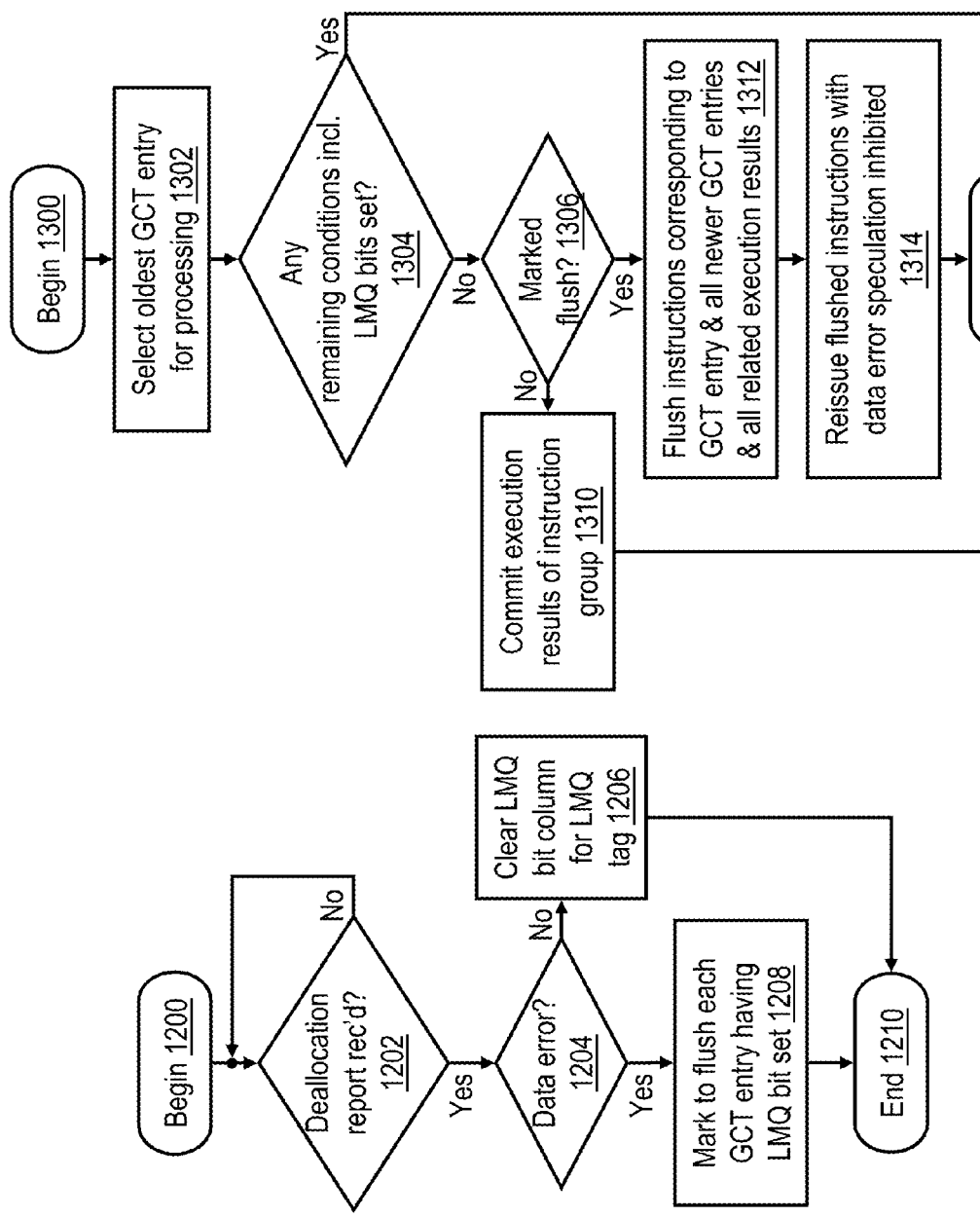
FIG. 12 is a high level logical flowchart of an exemplary process by which the GCT handles LMQ deallocation reports in accordance with one embodiment.
FIG. 13 is a high level logical flowchart of an exemplary process by which the GCT completes instruction groups in accordance with one embodiment.

Referring now to FIG. 12, there is depicted a high level logical flowchart of an exemplary process by which GCT 105 handles LMQ deallocation reports in accordance with one embodiment. The process begins at block 1200 and then proceeds to block 1202, which illustrates GCT 105 awaiting receipt from LMQ 112 of a deallocation report via deallocation bus 822. As noted above, the deallocation report preferably includes the LMQ tag of the relevant LMQ entry 820 and a "data good" indication indicating whether or not the target memory block contains a data error. In response to receipt of a deallocation report, GCT 105 determines at block 1204 whether or not the deallocation report indicates that the target memory block of the load-type instruction contains a data error. If not, GCT 105 clears the column of LMQ bits 806 corresponding to the LMQ tag specified in the deallocation report, thus removing a condition of completion of any load-type instructions dependent on the return of non-speculative data. The process of FIG. 12 then ends at block 1210. However, in response to a determination at block 1204 that the "data good" indication of the deallocation report indicates that the target memory block contains a data error (i.e., is deasserted), GCT 105 marks each table entry 802 for which the LMQ bit 806 corresponding to the LMQ tag contained in the deallocation report is set for flushing at completion. Thus, GCT 105 ensures that load-type instructions for which posted data error processing is performed are flushed if a data error is detected rather than committed to architected state of the processor core 104. Following block 1208 the process of FIG. 12 ends at block 1210.

With reference now to FIG. 13, there is depicted a high level logical flowchart of an exemplary process by which GCT 105 completes instruction groups in accordance with one embodiment. The process begins at block 1300 and then proceeds to block 1302, which illustrates GCT 105 selecting the oldest table entry 802 for processing. At block 1304, GCT 105 determines whether or not the selected table entry 802 has any remaining condition (including any set LMQ bit 806 in the LMQ vector 804) that prevents the instruction group tracked by the selected table entry 802 from being processed for completion. If so, the process ends at block 1320.

Returning to block 1304, in response to a determination that the selected table entry 802 does not have any remaining condition that prevents the instruction group tracked by the selected table entry 802 from being processed for completion, GCT 105 determines at block 1306 whether the selected table entry 802 is marked to be flushed. If not, GCT 105 completes all the instructions within the instruction group tracked by the selected table entry 802 by committing the execution results of those instructions to the architected state of the processor core 104. Thereafter, the process shown in FIG. 13 ends at block 1320. If, however, one or more instructions in the instruction group tracked by the selected table entry 802 are marked to be flushed, GCT 105 flushes the instructions corresponding to the selected table entry 802 and discards all related execution results. Thereafter, ISU 106 reissues the flushed instructions for execution with data error speculation disabled (block 1314). The process of FIG. 13 then ends at block 1320.

It should be noted that the techniques disclosed with reference to FIGS. 9-13 are not limited in application to the speculative finish of load-type instructions for which posted error detection processing is performed by the memory subsystem. Instead, the disclosed techniques are generally applicable to, and support the speculative finish of any instructions associated with long latency operations tracked by a data structure.

Figure 14:
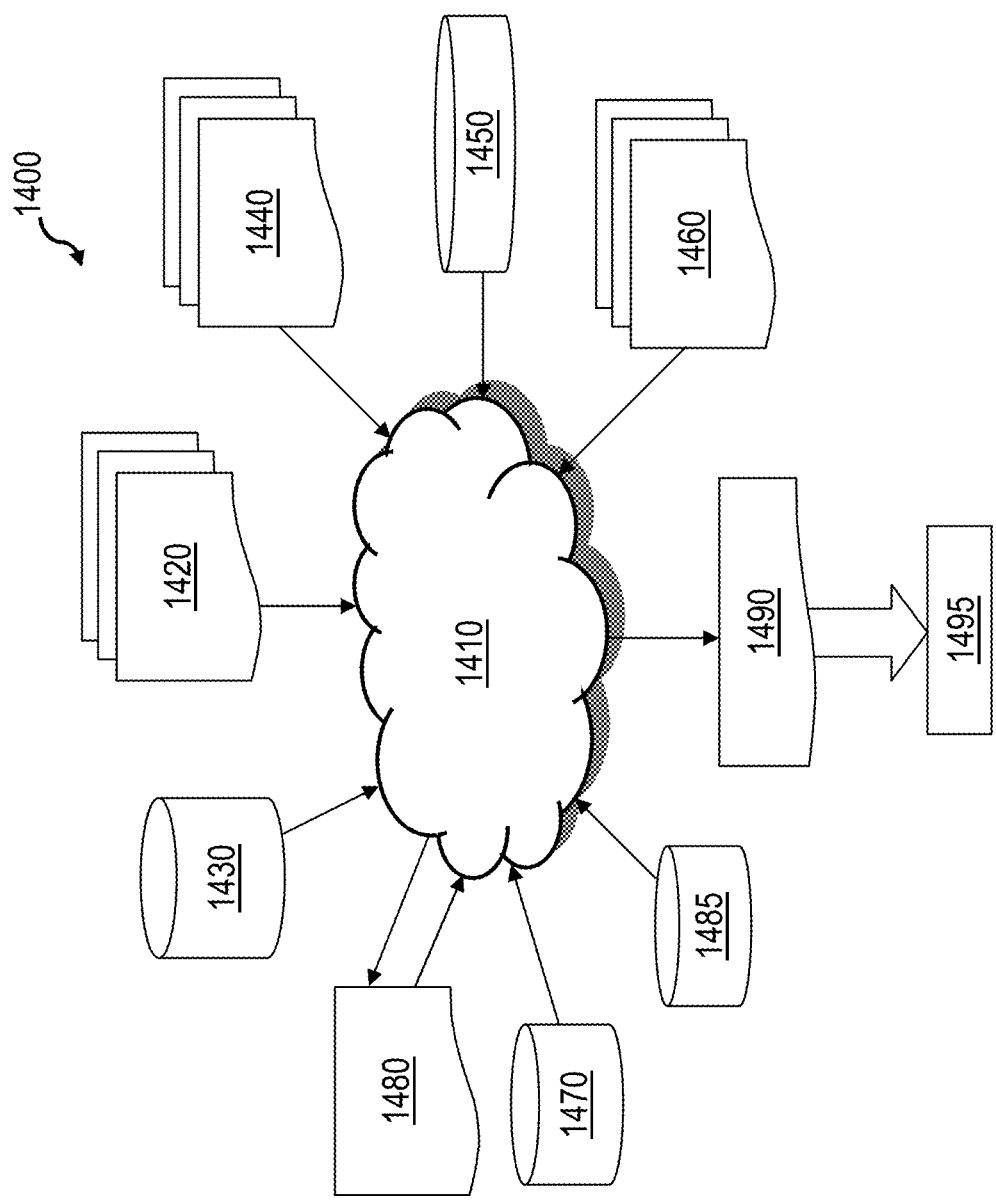
FIG. 14 is a data flow diagram of an exemplary design process.

Referring now to FIG. 14, there is depicted a block diagram of an exemplary design flow 1400 used for example, in semiconductor IC logic design, simulation, test, layout, and manufacture. Design flow 1400 includes processes, machines and/or mechanisms for processing design structures or devices to generate logically or otherwise functionally equivalent representations of the design structures and/or devices described above. The design structures processed and/or generated by design flow 1400 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 1400 may vary depending on the type of representation being designed. For example, a design flow 1400 for building an application specific IC (ASIC) may differ from a design flow 1400 for designing a standard component or from a design flow 1400 for instantiating the design into a programmable array, for example a programmable gate array (PGA) or a field programmable gate array (FPGA) offered by Altera® Inc. or Xilinx® Inc.

FIG. 14 illustrates multiple such design structures including an input design structure 1420 that is preferably processed by a design process 1410. Design structure 1420 may be a logical simulation design structure generated and processed by design process 1410 to produce a logically equivalent functional representation of a hardware device. Design structure 1420 may also or alternatively comprise data and/or program instructions that when processed by design process 1410, generate a functional representation of the physical structure of a hardware device. Whether representing functional and/or structural design features, design structure 1420 may be generated using electronic computer-aided design (ECAD) such as implemented by a core developer/designer. When encoded on a machine-readable data transmission, gate array, or storage medium, design structure 1420 may be accessed and processed by one or more hardware and/or software modules within design process 1410 to simulate or otherwise functionally represent an electronic component, circuit, electronic or logic module, apparatus, device, or system such as those shown above. As such, design structure 1420 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 1410 preferably employs and incorporates hardware and/or software modules for synthesizing, translating, or otherwise processing a design/simulation functional equivalent of the components, circuits, devices, or logic structures disclosed above to generate a netlist 1480 which may contain design structures such as design structure 1420. Netlist 1480 may comprise, for example, compiled or otherwise processed data structures representing a list of wires, discrete components, logic gates, control circuits, I/O devices, models, etc. that describes the connections to other elements and circuits in an integrated circuit design. Netlist 1480 may be synthesized using an iterative process in which netlist 1480 is resynthesized one or more times depending on design specifications and parameters for the device. As with other design structure types described herein, netlist 1480 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 1410 may include hardware and software modules for processing a variety of input data structure types including netlist 1480. Such data structure types may reside, for example, within library elements 1430 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 1440, characterization data 1450, verification data 1460, design rules 1470, and test data files 1485 which may include input test patterns, output test results, and other testing information. Design process 1410 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1410 without deviating from the scope and spirit of the invention. Design process 1410 may also include modules for performing standard circuit design processes such as timing analysis, verification, design rule checking, place and route operations, etc.

Design process 1410 employs and incorporates logic and physical design tools such as HDL compilers and simulation model build tools to process design structure 1420 together with some or all of the depicted supporting data structures along with any additional mechanical design or data (if applicable), to generate a second design structure 1490. Design structure 1490 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 1420, design structure 1490 preferably comprises one or more files, data structures, or other computer-encoded data or instructions that reside on transmission or data storage media and that when processed by an ECAD system generate a logically or otherwise functionally equivalent form of one or more of the embodiments of the invention disclosed herein. In one embodiment, design structure 1490 may comprise a compiled, executable HDL simulation model that functionally simulates the devices disclosed above.

Design structure 1490 may also employ a data format used for the exchange of layout data of integrated circuits and/or symbolic data format (e.g., information stored in a GDSII (GDS2), GL1, OASIS, map files, or any other suitable format for storing such design data structures). Design structure 1490 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above. Design structure 1490 may then proceed to a stage 1495 where, for example, design structure 1490: proceeds to tape-out, is released to manufacturing, is released to a mask house, is sent to another design house, is sent back to the customer, etc.

As has been described, in at least one embodiment of a data processing system, a selection is made, based at least on an access type of a memory access request, between at least a first timing and a second timing of data transmission with respect to completion of error detection processing on a target memory block of the memory access request. In response to receipt of the memory access request and selection of the first timing, data from the target memory block is transmitted to a requestor prior to completion of error detection processing on the target memory block. In response to receipt of the memory access request and selection of the second timing, data from the target memory block is transmitted to the requestor after and in response to completion of error detection processing on the target memory block.

In at least one embodiment of a data processing system, a selection is made, based at least on addresses of previously detected errors in a memory subsystem, between at least a first timing and a second timing of data transmission with respect to completion of error detection processing on a target memory block of the memory access request. In response to receipt of the memory access request and selection of the first timing, data from the target memory block is transmitted to a requestor prior to completion of error detection processing on the target memory block. In response to receipt of the memory access request and selection of the second timing, data from the target memory block is transmitted to the requestor after and in response to completion of error detection processing on the target memory block.

In a processor core, high latency operations are tracked in entries of a data structure associated with an execution unit of the processor core. In the execution unit, execution of an instruction dependent on a high latency operation tracked by an entry of the data structure is speculatively finished prior to completion of the high latency operation. Speculatively finishing the instruction includes reporting an identifier of the entry to completion logic of the processor core and removing the instruction from an execution pipeline of the execution unit. The completion logic records dependence of the instruction on the high latency operation and commits execution results of the instruction to an architected state of the processor only after successful completion of the high latency operation.

While various embodiments have been particularly shown as described with reference to a preferred embodiment, it will be understood by those skilled in the art that various changes in form and detail may be made therein without departing from the spirit and scope of the claims. For example, although aspects have been described with respect to a computer system executing program code that directs the functions of the present invention, it should be understood that present invention may alternatively be implemented as a program product including a computer-readable storage device (e.g., volatile or non-volatile memory, optical or magnetic disk or other statutory manufacture) that stores program code that can be processed by a data processing system. Further, the term "coupled" as used herein is defined to encompass embodiments employing a direct electrical connection between coupled elements or blocks, as well as embodiments employing an indirect electrical connection between coupled elements or blocks achieved using one or more intervening elements or blocks. In addition, the term "exemplary" is defined herein as meaning one example of a feature, not necessarily the best or preferred example.

What is claimed is:

1. A method of data processing, comprising:
   in response to receiving a memory access request, selecting, based at least on an access type specified by the memory access request, between at least a first timing and a second timing of data transmission with respect to completion of error detection processing on a target memory block of the memory access request;
   performing error detection processing on the target memory block, wherein performing error detection processing includes performing error detection processing utilizing a same error detection technique for both the first and second timings;
   in response to receipt of the memory access request and selection of the first timing, transmitting data from the target memory block to a requestor prior to completion of the error detection processing on the target memory block; and in response to receipt of the memory access request and selection of the second timing, transmitting data from the target memory block to the requestor after and in response to completion of the error detection processing on the target memory block.

2. The method of claim 1, wherein the selecting includes selecting the first timing for the memory access request based on the memory access request being one of a set including a demand data load request generated by execution of a load-type instruction and a data prefetch request.

3. The method of claim 1, wherein the selecting includes a memory subsystem selecting between at least the first timing and the second timing.

4. The method of claim 1, wherein the selecting further includes selecting between the first timing and the second timing based at least on addresses of previously detected errors in a memory subsystem.

5. The method of claim 1, and further comprising:
a memory subsystem sending, in association with the target memory block, a posted status indicator of a timing of data transmission with respect to completion of error detection processing on the target memory block.

6. The method of claim 4, and further comprising handling the target memory block in a processor core based on a timing indicated by the posted status indicator.

7. The method of claim 1, and further comprising:
in response to receipt of the memory access request and selection of the first timing, transmitting a data error indicator indicating whether or not the target memory block has a data error.

8. The method of claim 7, wherein:
the requestor comprises a processor core;
the method further comprises:
in the processor core, speculatively finishing execution of one or more instructions that are dependent on the target memory block prior to receipt of the data error indicator; and
completing the one or more instructions in response to the data error indicator.

9. The method of claim 7, wherein:
transmitting data includes transmitting granules of the target memory block at intervals; and
transmitting the data error indicator includes transmitting the data error indicator with one of the granules other than a first granule.

10. The method of claim 1, and further comprising:
in response to detection of an error in the target memory block, the requestor reissuing the memory access request with the first timing disabled.

* * * * *